US008144896B2

(12) United States Patent
Liu et al.

(10) Patent No.: US 8,144,896 B2
(45) Date of Patent: Mar. 27, 2012

(54) SPEECH SEPARATION WITH MICROPHONE ARRAYS

(75) Inventors: Zicheng Liu, Bellevue, WA (US); Philip Andrew Chou, Bellevue, WA (US); Jacek Dmochowski, Ottawa (CA)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 12/035,439

(22) Filed: Feb. 22, 2008

(65) Prior Publication Data

US 2009/0214052 A1 Aug. 27, 2009

(51) Int. Cl.
*H04B 15/00* (2006.01)

(52) U.S. Cl. .......................................................... 381/94.3

(58) Field of Classification Search .............. 381/92–94, 381/94.3

See application file for complete search history.

(56) References Cited

U.S. PATENT DOCUMENTS

| | | | | |
|---|---|---|---|---|
| 6,185,309 | B1 | 2/2001 | Attias | |
| 6,865,490 | B2 | 3/2005 | Cauwenberghs et al. | |
| 6,868,045 | B1 | 3/2005 | Schroder | |
| 7,035,416 | B2 | 4/2006 | Matsuo | |
| 7,085,245 | B2 * | 8/2006 | Song et al. | 370/290 |
| 7,647,209 | B2 * | 1/2010 | Sawada et al. | 702/190 |
| 7,860,134 | B2 * | 12/2010 | Spence et al. | 370/536 |
| 2003/0206640 | A1 | 11/2003 | Malvar | |
| 2004/0117186 | A1 | 6/2004 | Ramakrishnan et al. | |
| 2004/0220800 | A1 | 11/2004 | Kong et al. | |
| 2006/0053002 | A1 | 3/2006 | Visser et al. | |
| 2006/0212291 | A1 | 9/2006 | Matsuo | |
| 2007/0165879 | A1 | 7/2007 | Deng et al. | |
| 2007/0260340 | A1 | 11/2007 | Mao | |
| 2008/0052074 | A1 * | 2/2008 | Gopinath et al. | 704/256 |
| 2008/0215651 | A1 * | 9/2008 | Sawada et al. | 708/205 |
| 2008/0232607 | A1 * | 9/2008 | Tashev et al. | 381/71.11 |
| 2009/0010451 | A1 * | 1/2009 | Burnett | 381/92 |
| 2009/0055170 | A1 * | 2/2009 | Nagahama | 704/226 |
| 2009/0111507 | A1 * | 4/2009 | Chen | 455/550.1 |

FOREIGN PATENT DOCUMENTS

WO 2007100330 A1 9/2007

OTHER PUBLICATIONS

Parra et al, “Acoustic Source Separation with Microphone Arrays”, Montreal Workshop, Nov. 6, 2004, pp. 1-23.

(Continued)

*Primary Examiner* — Nathan Ha

(57) ABSTRACT

A system that facilitates blind source separation in a distributed microphone meeting environment for improved teleconferencing. Input sensor (e.g., microphone) signals are transformed to the frequency-domain and independent component analysis is applied to compute estimates of frequency-domain processing matrices. Modified permutations of the processing matrices are obtained based upon a maximum magnitude based de-permutation scheme. Estimates of the plurality of source signals are provided based upon the modified frequency-domain processing matrices and input sensor signals. Optionally, segments during which the set of active sources is a subset of the set of all sources can be exploited to compute more accurate estimates of frequency-domain mixing matrices. Source activity detection can be applied to determine which speaker(s), if any, are active. Thereafter, a least squares post-processing of the frequency-domain independent components analysis outputs can be employed to adjust the estimates of the source signals based on source inactivity.

20 Claims, 11 Drawing Sheets

OTHER PUBLICATIONS

Wilson et al, "AudioVideo Array Source Separation for Perceptual User Interfaces", ACM, 2001, Orlando, FL, pp. 1-7.

Rennie et al, "Variational Probabilistic Speech Separation Using Microphone Arrays", IEEE Transactions on Audio Speech and Language Processing, vol. 15, No. 1, Jan. 2007, pp. 135-149.

Jacek P. Dmochowski, Zicheng Liu, Phil Chou, Blind Source Separation in a Distributed Microphone Meeting Environment for Improved Teleconferencing , 2008 International conference on Acoustics, Speech, and Signal Processing (ICASSP08) , Las Vegas, Mar. 30-Apr. 4, 2008, 4 pages.

* cited by examiner

SPEECH SEPARATION WITH MICROPHONE ARRAYS

BACKGROUND

The availability of inexpensive audio input sensors (e.g., microphones) has dramatically increased the use of teleconferencing for both business and personal multi-party communication. By allowing individuals to effectively communicate between physically distant locations, teleconferencing can significantly reduce travel time and/or costs which can result in increased productivity and profitability.

With increased frequency, teleconferencing participants can connect devices such as laptops, personal digital assistants and the like with microphones (e.g., embedded) over a network to form an ad hoc microphone array which allows for multi-channel processing of microphone signals. Ad hoc microphone arrays differ from centralized microphone arrays in several aspects. First, the inter-microphone spacing is generally large which can lead to spatial aliasing. Additionally, since the various microphones are generally not connected to the same clock, network synchronization is necessary. Finally, each speaker is usually closer to the speaker's microphone than to the microphone of other participants which can result in a high input signal-to-interference ratio.

Conventional teleconferencing systems have proven frustrating for teleconferencing participants. For example, overlapped speech from multiple remote participants can result in poor intelligibility to a local listener. Overlapped speech can further cause difficulties for sound source localization as well as beam forming.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates blind source separation in a distributed microphone meeting environment for improved teleconferencing. Separation of individual source signals from a mixture of source signals is commonly known as "blind source separation" since the separation is performed without prior knowledge of the source signals. Input sensors (e.g., microphones) provide signals that are transformed to the frequency-domain and independent component analysis is applied to compute estimates of frequency-domain processing matrices (e.g., mixing or separation matrices) for each frequency band. Based upon the frequency-domain processing matrices, relative energy attenuation experienced between a particular source signal and the plurality of input sensors is computed to obtain modified permutations of the processing matrices. Estimates of the plurality of source signals are provided based on the plurality of frequency domain sensor signals and the modified permutations of the processing matrices.

A computer-implemented audio blind source separation system includes a frequency transform component for transforming a plurality of sensor signals to a corresponding plurality of frequency-domain sensor signals. The system further includes a frequency domain blind source separation component for estimating a plurality of source signals per frequency band based on the plurality of frequency domain sensor signals and processing matrices computed independently for each of a plurality of frequency bands.

Optionally, segments during which a set of active sources (e.g., speakers) is a proper subset of a set of all sources (e.g., speakers) can be exploited to compute more accurate estimates of the frequency-domain processing matrices. Source activity detection can be applied to the signals estimated from the frequency domain blind source separation component to determine which sources (e.g., speaker(s)), if any, are active at a particular moment in time. Thereafter, a least squares post-processing of the frequency-domain independent component analysis processing matrices can be employed to adjust the estimates of the source signals based on source inactivity.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
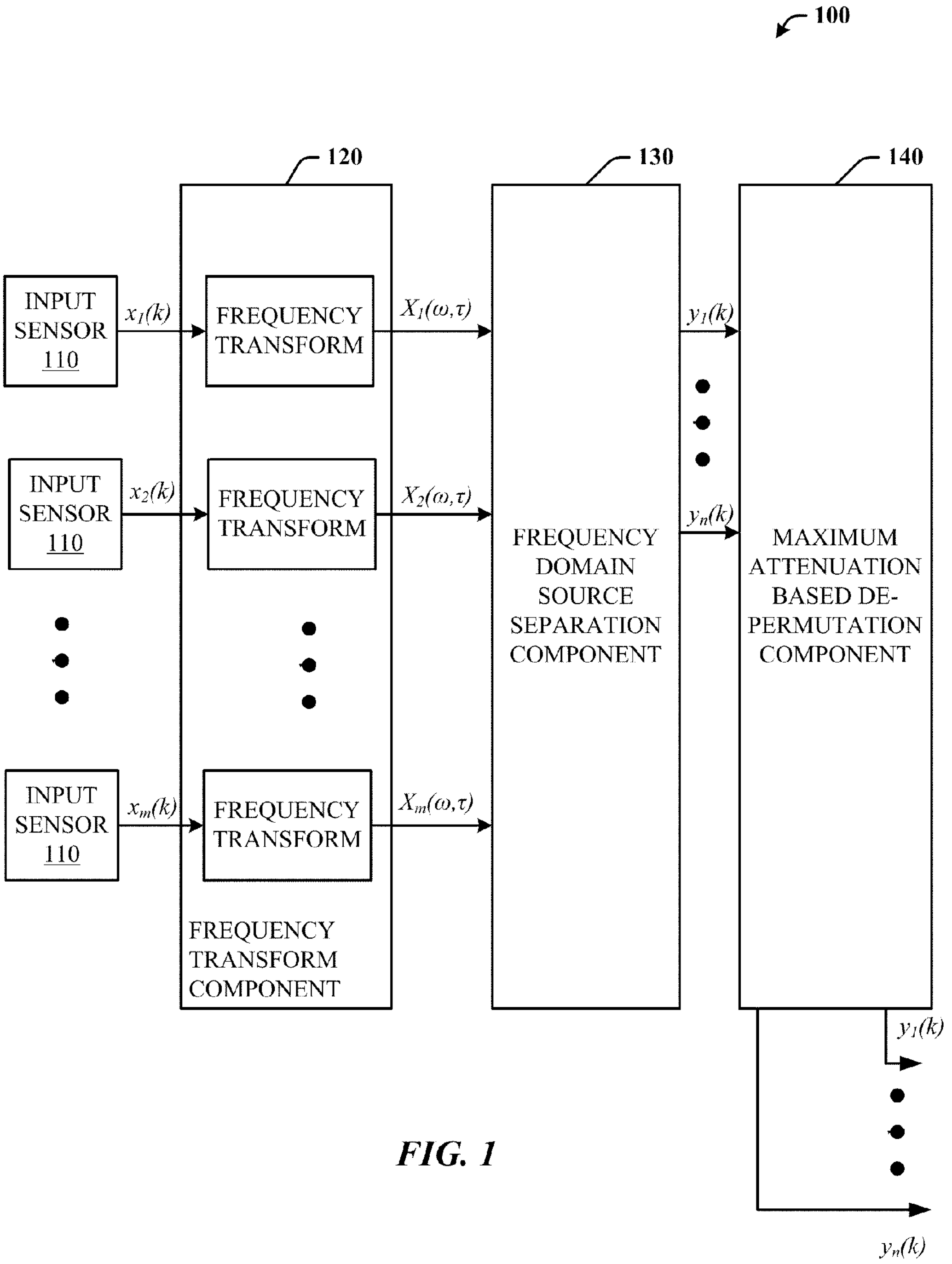
FIG. 1 illustrates a computer-implemented audio blind source separation system.

The disclosed systems and methods facilitate blind source separation in a distributed microphone meeting environment for improved teleconferencing. A frequency-domain approach to blind separation of speech which is tailored to the nature of the teleconferencing environment is employed.

Input sensor signals are transformed to the frequency-domain and independent component analysis is applied to compute estimates of frequency-domain processing matrices for each frequency band. A maximum-magnitude-based de-permutation scheme is used to obtain modified permutations of the processing matrices. Finally the estimates of the source signals are obtained by applying the de-permuted processing matrices (e.g., separation matrices and/or mixing matrices) to the input signals.

Optionally, the presence of single-source and, in general, any segments during which the set of active sources is a subset of the set of all speakers, can be exploited to compute more accurate estimates of frequency-domain processing matrices. For example, source activity detection can be applied to the estimated source signals obtained from the speech separation component to determine which speaker(s), if any, are active. Thereafter, a least squares post-processing of the frequency-domain independent components analysis processing matrices can be employed to adjust the estimates of the source signals based on speaker inactivity.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented audio blind source separation system 100. The system 100 employs a frequency-domain approach to blind source separation of speech tailored to the nature of the teleconferencing environment.

Figure 2:
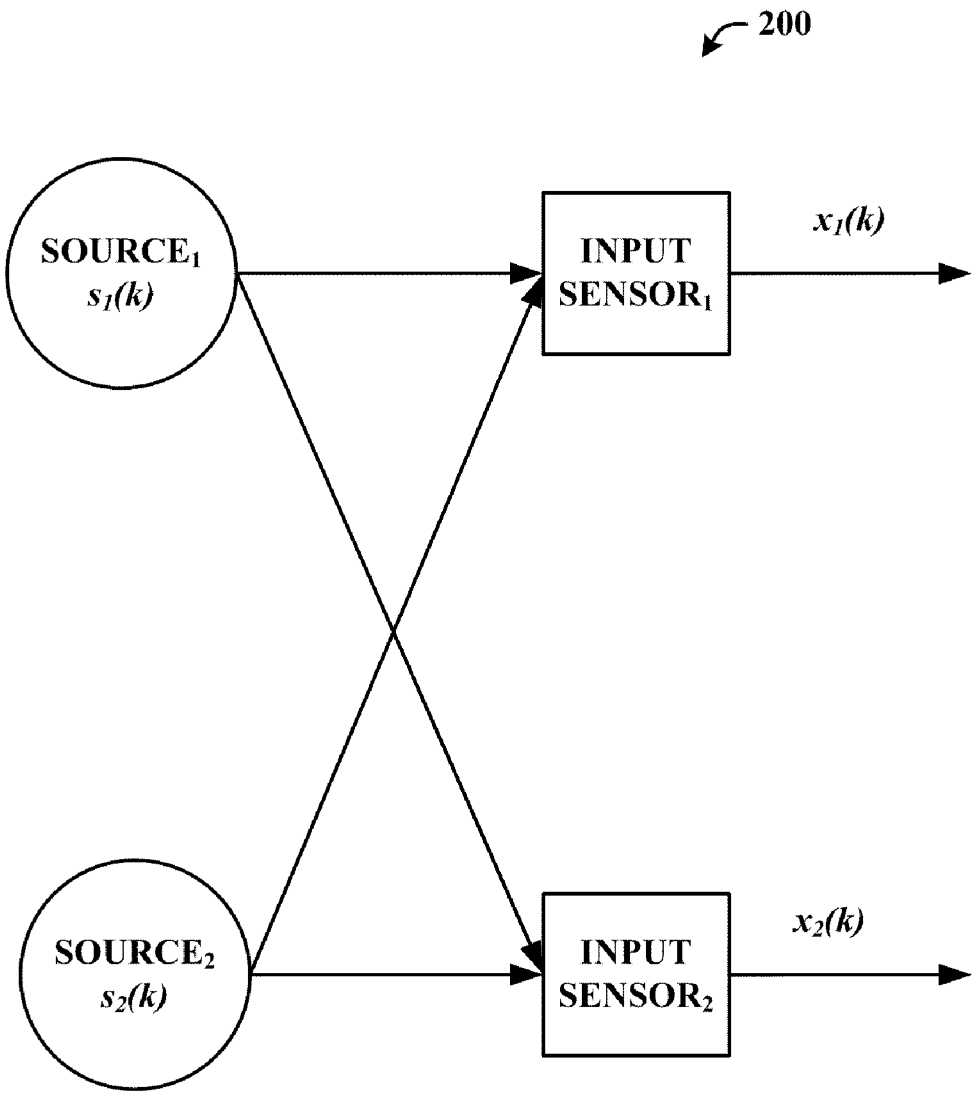
FIG. 2 illustrates an exemplary two source arrangement for mixing of source signals.

It is well known that, speech mixtures received at an array of microphones are not instantaneous but convolutive. Referring briefly to FIG. 2, $\text{source}_1$ $s_1(k)$ is received at both input $\text{sensor}_1$ and at input $\text{sensor}_2$. Similarly, $\text{source}_2$ $s_2(k)$ is received at both input $\text{sensor}_2$ and at input $\text{sensor}_1$. The signal received at input $\text{sensor}_2$ due to $\text{source}_1$ is an additive mixture of many copies of $\text{source}_1$ with various gains and delays. Thus, the signal received at input $\text{sensor}_1$ $x_1(k)$ and input $\text{sensor}_2$ $x_2(k)$ is a convolutive mixture of $s_1(k)$ and $s_2(k)$.

Turning back to FIG. 1, the system 100 performs source separation in the frequency-domain by decomposing the signals at the microphone array into narrowband frequency bins with processing performed on each bin. Initially, consider an array of M input sensors 110 (e.g., microphones) where the output of the mth input sensor 110 is denoted by $x_m(k)$ where k is a discrete-time sample index. Assuming N sources with signals $s_n(k)$ an output of the mth input sensor 110 is the convolutive mixture:

$$x_m(k)=\Sigma_{n=1}^{N}\Sigma_{l=0}^{L_h-1}h_{mn}(l)s_n(k-l)+v_m(k),\ m=1, \ldots, M, \quad \text{Eq. (1)}$$

where $h_{mn}$ is the finite impulse response (FIR) channel from source n to input sensor m, $L_h$ is the length of the longest impulse response, and $v_m(k)$ is the additive sensor noise at input sensor 110 *m*. It is generally assumed that the source signals are mutually independent. The task of blind source separation in such convolutive mixtures is to recover the source signals $s_n(k)$ given only the signals from the input sensors 110 (e.g., microphone recordings) $x_m(k)$. In one embodiment, the quantity of sources (N) is less than or equal to the quantity of input sensors 110 (M).

Separation of the signals can be achieved by applying a FIR filter to each input sensor's output and them summing across the sensors:

$$y_n(k)=\Sigma_{m=1}^{M}\Sigma_{l=0}^{L_w-1}w_{nm}(l)x_m(k-l),\ n=1, \ldots, N, \quad \text{Eq. (2)}$$

where $y_n(k)$ is the estimate of $s_n(k)$, $w_{nm}(k)$ is the filter applied to input sensor 110 *m* in order to separate source n, and $L_w$ is the length of the longest separation filter.

Taking the Fourier transform of Equation (1) and rewriting in matrix notation, the instantaneous mixture model is:

$$x(\omega) = \sum_{n=1}^{N} h_{:n}(\omega)S_n(\omega) + v(\omega) = H(\omega)s(\omega) + v(\omega) \quad \text{Eq. (3)}$$

where $$x(\omega) = [\, X_1(\omega) \;\; X_2(\omega) \;\; \cdots \;\; X_M(\omega) \,]^T$$

$$h_{:n}(\omega) = [\, H_{1n}(\omega) \;\; H_{2n}(\omega) \;\; \cdots \;\; H_{Mn}(\omega) \,]^T$$

-continued $$H(\omega) = \begin{bmatrix} H_{11}(\omega) & H_{12}(\omega) & \cdots & H_{1N}(\omega) \\ H_{21}(\omega) & H_{22}(\omega) & \cdots & H_{2N}(\omega) \\ \vdots & \vdots & \ddots & \vdots \\ H_{M1}(\omega) & H_{M2}(\omega) & \cdots & H_{MN}(\omega) \end{bmatrix}$$

$$s(\omega) = [\, S_1(\omega) \;\; S_2(\omega) \;\; \cdots \;\; S_N(\omega) \,]^T$$

and $X_m(\omega)$, $H_{mn}(\omega)$, $S_n(\omega)$, and $V_m(\omega)$ are the discrete-time Fourier transforms of $x_m(k)$ $h_{mn}(k)$ $s_n(k)$ and $v_m(k)$ respectively. $H(\omega)$ is known as the mixing matrix. In the frequency-domain, the separation model becomes:

$$y(\omega)=W(\omega)x(\omega), \quad \text{Eq. (4)}$$

where $y(\omega)=[Y_1(\omega)Y_2(\omega) \ldots Y_N(\omega)]^T$ is a vector of the Fourier transformed separated signals $y_n(k)$ and $W(\omega)$ is the separation matrix with $[W(\omega)]_{nm}=W_{nm}(\omega)$. Herein, $H(\omega)$ and $W(\omega)$ are referred to as processing matrices.

To enable frequency-domain processing, the time-domain input sensor 110 signals $x_m(k)$ are transformed to the frequency-domain by a frequency transform component 120. The frequency transform component transforms a plurality of input sensor 110 signals to a corresponding plurality of frequency-domain sensor signals. In one embodiment, the frequency transform component 120 employs the short-time Fourier transform:

$$X_m(\omega,\tau)=\Sigma_{l=-\infty}^{\infty}x_m(l)\text{win}(l-\tau)e^{-j\omega l} \quad \text{Eq. (5)}$$

where win(l) is a windowing function with win(l)=0, $|l|>W$, and $\tau$ is the time frame index. Similar definitions hold for $V_m(\omega,\tau)$, $S_n(\omega,\tau)$, $x(\omega,\tau)$, $v(\omega,\tau)$, $s(\omega,\tau)$. Equations (3) and (4) become:

$$x(\omega,\tau)=H(\omega,\tau)s(\omega,\tau)+v(\omega,\tau), \quad \text{Eq. (6)}$$

$$y(\omega,\tau)=W(\omega)x(\omega,\tau) \quad \text{Eq. (7)}$$

For each frequency $\omega$, the complex-valued independent component analysis (ICA) procedure computes a matrix $W(\omega)$ such that the components of the output $y(\omega, \tau)$ are mutually independent. This can be achieved, for example, through a complex version of the FastICA algorithm and/or a complex version of InfoMax along with a natural gradient procedure.

Assuming that the components of $s(\omega, \tau)$ are mutually independent and that the microphone noise $v(\omega, \tau)$ is zero, the separation matrix $W(\omega)$ selected by independent component analysis will be equal to the pseudo-inverse of the underlying mixing matrix $H(\omega)$ up to a permutation and scaling, namely, $W(\omega)=\Lambda(\omega)\, P(\omega)\, H^+(\omega)$ where $\Lambda(\omega)=\text{diag}(\lambda_1, \ldots, \lambda_N)$ is a diagonal matrix and $P(\omega)$ is a permutation matrix. Thus, $y(\omega, \tau)=[\lambda_1 s_{\Pi_\omega^{-1}(1)}(\omega,\tau), \ldots, \lambda_N s_{\Pi_\omega^{-1}(N)}(\omega,\tau)]^T$, where $\Pi_\omega(i)=j$ is the permutation mapping between the ith source and the jth separate signal at frequency $\omega$. Moreover, denoting $W^+(\omega)=H(\omega)P^{-1}(\omega)\Lambda^{-1}(\omega)=[a_{:1}\ a_{:2} \ldots a_{:N}]$, it can be determined that $a_{:n}(\omega)=h_{:\Pi_\omega^{-1}(n)}(\omega)/\lambda_n$. The challenge in convolutive BSS is to determine $P(\omega)$ and $\Lambda(\omega)$ at each frequency.

The system 100 further includes a frequency domain blind source separation component 130 for computing estimates of a plurality of source signals $y_n(k)$ for each of a plurality of frequency bands based on the plurality of frequency-domain sensor signals transformed by the frequency transform component 120 and processing matrices computed independently for each of the plurality of frequency bands.

The system 100 additionally includes a maximum attenuation based de-permutation component 140 for obtaining modified permutations of the processing matrices based upon a maximum-magnitude based de-permutation scheme. In one embodiment, a permutation solving scheme applicable to distributed microphones can be employed in which magnitudes are taken into account. In this embodiment, methods based on source localization that utilize the phases of the columns $a_{:n}(\omega)$ are not employed due to aliasing.

For ease of discussion, if $u=[u_1\ u_2\ \ldots\ U_{N_u}]^T$ is a complex vector, then $u'=[|u_1|\ |u_2|\ \ldots\ |U_{N_u}|]^T$ is the vector u with the phases of each element discarded. In this embodiment, in order to remove the scaling ambiguity that appears in the columns $a'_{:n}(\omega)$, at each frequency, the magnitudes of the vectors $a'_{:n}(\omega)$ are normalized to unit norm:

$$\hat{a}'_{:n}(\omega) = \frac{a'_{:n}(\omega)}{\|a'_{:n}(\omega)\|} = \frac{h'_{:\Pi_\omega^{-1}(n)}(\omega)}{\left\|h'_{:\Pi_\omega^{-1}(n)}(\omega)\right\|}, \qquad \text{Eq. (8)}$$

thus removing the scaling factor, which is constant over the entries of a fixed column $a_{:n}(\omega)$. The resulting normalized column vectors reflect the relative energy attenuation experienced between source $\Pi_\omega^{-1}(n)$ and the array of input sensors 110. Each source is identified by its own vector of relative attenuation values, which are independent of frequency and can be employed to solve the permutation ambiguity.

In the teleconferencing environment, the attenuation experienced by a speaker at the speaker's input sensor 110 will be significantly less than that experienced by the same speaker at the other participants' input sensor(s) 110. Accordingly, in one embodiment, a de-permutation approach that assigns the vector $\hat{a}'_{:n}(\omega)$ to the speaker identified by the largest element of $\hat{a}'_{:n}(\omega)$ is employed. Specifically, $h'_{:j}(\omega)=\Sigma_{i=1}^{N} p_{ij} a'_i(\omega)$, where $p_{ij}(\omega)=1$ if $j=\arg\max_n \hat{a}'_{:ni}(\omega)$ and $p_{ij}(\omega)=0$ otherwise. Notice that with this approach (hereinafter referred to as "maximum-magnitude" or MM), if two columns exhibit a maximum at the same row, the synthesized signals will contain components from multiple source signals at a particular frequency. However a more detrimental swapping of the coefficients from different sources will not generally occur.

Optionally, the presence of segments during which the set of active sources (e.g., speakers) is a subset of the set of sources can be exploited to compute more accurate estimates of the frequency-domain mixing matrices. While blind techniques do not have knowledge of the on-times of the various sources, such information can be estimated from the separated signals.

While this embodiment is described with respect to modifying the processing matrices computed by the system 100, those skilled in the art will recognize that the source activity detection technique described herein can be employed with processing matrices of any suitable blind source separation system.

In order to exploit period(s) of source inactivity, initially it is noted that conventional independent component analysis-based convolutive blind source separation does not explicitly take noise associated with the input sensor 110 into account in its solution. Equation (6) can be rewritten to include F frames:

$$X(\omega)=H(\omega)S(\omega)+V(\omega), \qquad \text{Eq. (11)}$$

where $$X(\omega)=[x(\omega,1)\ \ldots\ x(\omega,F)],$$

$$S(\omega)=[s(\omega,1)\ \ldots\ s(\omega,F)],$$

$$V(\omega)=[v(\omega,1)\ \ldots\ v(\omega,F)].$$

An approximation factorization of input sensor 110 measurement $X(\omega)$ into matrices $H(\omega)$ and $S(\omega)$ is sought such that the squared error the input sensor noise $\|V(\omega)\|^2$ is minimized. This is clearly trivial to achieve if there are no constraints on $S(\omega)$. For example, if there are N=M simultaneously active sources, then $H(\omega)$ can be set to equal I and $S(\omega)$ can be set to equal $X(\omega)$ to obtain zero error. However, if it is known that for some frames of $S(\omega)$ a subset of the sources are inactive, then the mixing matrix $H(\omega)$ becomes constrained. For example, if only sources $n_1$ and $n_2$ are active in frames $\tau \in A_{12}$, then the set of vectors $\{X(\omega, \tau): \tau \in A_{12}\}$ determines the subspace spanned by the columns $h_{:n_1}(\omega)$ and $h_{:n_2}(\omega)$, while if only sources $n_1$ and $n_3$ are active in frames $\tau \in A_{13}$, then $\{X(\omega, \tau): \tau \in A_{13}\}$ determines the subspace spanned by the columns $h_{:n_1}(\omega)$ and $h_{:n_3}(\omega)$. Intersecting these subspaces determines the column $h_{:n_1}(\omega)$ (up to scale). Thus this least squares approach can refine $H(\omega)$ using knowledge of the frames during which a subset of the sources are inactive.

Initially, an estimate of which speakers are inactive can be determined by applying source activity detection (SAD) to the independent component analysis outputs of Equation (7). In one embodiment, a simple energy-based threshold detection is employed. Averaging over the frequencies, the energy of separated speaker n during frame τ is computed as follows:

$$E_{Y_n,\tau} = \frac{1}{2\pi}\int_{-\pi}^{\pi} |Y_n(\omega, \tau)|^2 dw, \qquad \text{Eq. (12)}$$

and then whether the source (e.g., speaker) is inactive during that frame is determined: speaker n during frame τ is inactive if $E_{Y_n,\tau} \leqq \delta$, and, active otherwise, where δ is a SAD threshold parameter.

Continuing, an estimate of $H(\omega)$ as the pseudo-inverse of the ICA result (e.g., $H(\omega)=W(\omega)^+$) is employed. Then $S(\omega)$ can be solved in Equation (11) to minimize $\|V(\omega)\|^2$ under the constraint that $S_n(\omega, \tau)=0$ when source n is inactive in frame τ. Specifically, considering each column of $S(\omega)$ separately, let $\tilde{s}(\omega, \tau)$ be the subvector of $s(\omega, \tau)$ comprising only the active sources, and let $\tilde{H}(\omega)$ be the submatrix of $H(\omega)$ comprising only the corresponding columns. Then:

$$\tilde{s}(\omega,\tau)=\tilde{H}^+(\omega)x(\omega,\tau)$$

minimizes the norm of $v(\omega, \tau)$ under the speaker inactivity constraints. Performing this for all frames T minimizes the squared error $\|V(\omega)\|^2$ under the inactivity constraints.

Continuing, $S(\omega)$ just determined can be fixed and re-solve for $H(\omega)$ in Equation (11) to minimize $\|V(\omega)\|^2$ still further. Equation (11) can be transposed:

$$X^T(\omega)=S^T(\omega)H^T(\omega)+V^T(\omega), \qquad \text{Eq. (14)}$$

and, as discussed previously, each column of $H^T(\omega)$ can be solved separately: let $h_{m:}^T$ be the mth column of $H^T(\omega)$, let $X_m(\omega,:)^T$ be the mth column of $X^T(\omega)$, and let $V_m(\omega,:)^T$ be the mth of $V^T(\omega)$. Then the following minimizes the norm of $V_m(\omega,:)^T$:

$$h_{m:}^T=(S^T)^+(\omega)X_m(\omega,:)^T$$

Performing this for substantially all input sensors 110 *m* minimizes the squared error $\|V(\omega)\|^2$ under the inactivity constraints.

Iterating this procedure (solving $S(\omega)$ for fixed $H(\omega)$) and then solving $H(\omega)$ for fixed $S(\omega)$) is a descent algorithm that minimizes the same metric $\|V(\omega)\|^2$ in each step and hence it converges. This potentially improves the mixing matrix $H(\omega))=W^+(\omega)$ obtained by ICA, under the constraint that some of the sources are inactive in some of the frames. Note that if all sources are active in all frames, then the initial mixing matrix H(ω) determined from ICA remains unchanged by these iterations.

Once an improved mixing matrix (H(ω)) is obtained, an improved separation matrix $W(\omega)=H^{+}(\omega)$, and an improved source separation (7) are obtained, the newly separated sources can be used to re-estimate the inactive sources in each frame, and the procedure can be repeated until the squared error no longer decreases (e.g., within a threshold amount). Finally, in an outermost loop, the threshold δ can be gradually increased (becoming more aggressive in declaring sources to be inactive), until the squared error begins to rise sharply, indicating false negatives in the SAD.

While a post-processing procedure to minimize the norm of the error in the mixing model (11) has been described, a corresponding algorithm can also be employed to minimize the norm of an error in the separation model, $$Y(\omega)=W(\omega)X(\omega)+U(\omega)$$

where U(ω) is the error under constraints that some components of Y(ω) are zero. Those skilled in the art will recognize that while the principles are similar, the resulting separation filters will be different.

Figure 3:
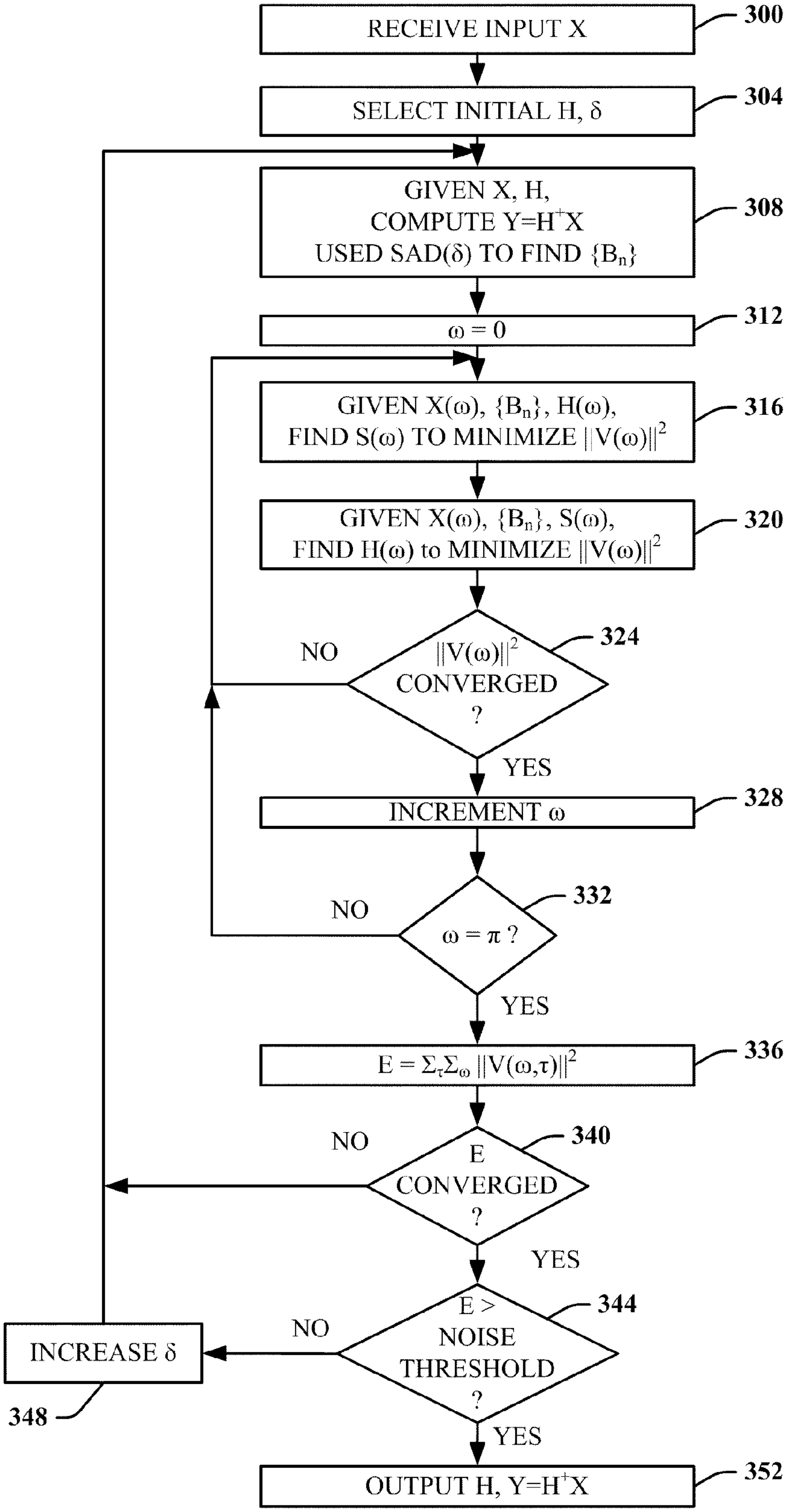
FIG. 3 illustrates a least-squares post-processing method for obtaining an improved mixing matrix $H(\omega)$.

Referring to FIG. 3, a least-squares post-processing method for obtaining an improved mixing matrix H(ω) is illustrated. At 300, an input X(ω) is received, for example, from the system 100. At 304, an initial H(ω) and SAD threshold parameter 6 are selected. At 308, given the input X(ω) and mixing matrix H(ω), source signal output are computed $(Y(\omega)=H^{+}(\omega)X(\omega))$ and source activity detection is employed using the SAD threshold parameter δ to find a set of frames for which source n is inactive $(\{B_n\})$.

Next, at 312, ω is initialized (e.g., set to zero). At 316, given the input X(ω), the set of frames for which source n is inactive $\{B_n\}$ and mixing matrix H(ω), S(ω) is found to minimize $\|V(\omega)\|^2$. Similarly, at 320, given the input X(ω), the set of frames for which source n is inactive $\{B_n\}$ and S(ω), H(ω) is found to minimize $\|V(\omega)\|^2$.

At 324, a determination is made as to whether $\|V(\omega)\|^2$ has converged. If the determination at 324 is NO, processing continues at 316. If the determination at 324 is YES, at 328, ω is incremented (e.g., to continue to the next frequency band).

At 332, a determination is made as to whether ω=π. If the determination at 332 is NO, processing continues at 316. If the determination at 332 is YES, at 336, the squared error $(\|V(\omega)\|^2)$ is summed across τ and ω. At 340, a determination is made as to whether the summed squared error has converged. If the determination at 340 is NO, processing continues at 308.

If the determination at 340 is YES, at 344, a determination is made as to whether the summed squared error is greater than a noise threshold. If the determination at 344 is NO, at 348, the SAD threshold parameter (δ) is increased and processing continues at 308. If the determination at 344 is YES, the modified mixing matrix H(ω) is provided as an output.

Figure 4:
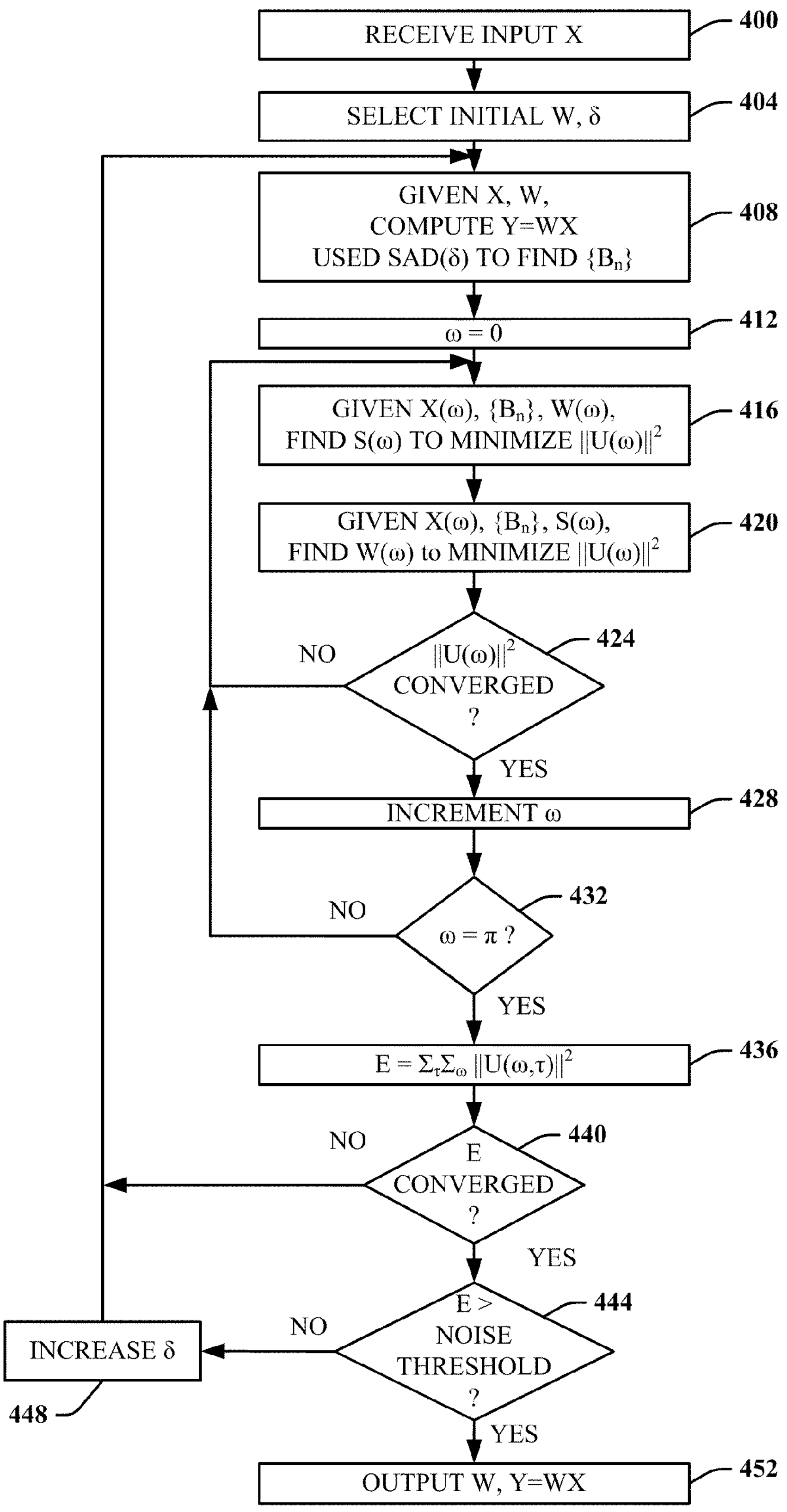
FIG. 4 illustrates least-squares post-processing method for obtaining an improved separation matrix $W(\omega)$.

Referring to FIG. 4, a least-squares post-processing method for obtaining an improved separation matrix W(ω) is illustrated. At 400, an input X(ω) is received, for example, from the system 100. At 404, an initial W(ω) and SAD threshold parameter δ are selected. At 408, given the input X(ω) and separation matrix W(ω), source signal output are computed $(Y(\omega)=W(\omega)X(\omega))$ and source activity detection is employed using the SAD threshold parameter δ to find a set of frames for which source n is inactive $(\{B_n\})$.

Next, at 412, ω is initialized (e.g., set to zero). At 416, given the input X(ω), the set of frames for which source n is inactive $\{B_n\}$ and separation matrix W(ω), S(ω) is found to minimize error in the separation model $\|U(\omega)\|^2$. Similarly, at 420, given the input X(ω), the set of frames for which source n is inactive $\{B_n\}$ and S(ω), W(ω) is found to minimize $\|U(\omega)\|^2$.

At 424, a determination is made as to whether $\|U(\omega)\|^2$ has converged. If the determination at 424 is NO, processing continues at 416. If the determination at 424 is YES, at 428, ω is incremented.

At 432, a determination is made as to whether ω=π. If the determination at 432 is NO, processing continues at 416. If the determination at 432 is YES, at 436, the squared error $(\|U(\omega)\|^2)$ is summed across τ and ω. At 440, a determination is made as to whether the summed squared error has converged. If the determination at 440 is NO, processing continues at 408.

If the determination at 440 is YES, at 444, a determination is made as to whether the summed squared error is greater than a noise threshold. If the determination at 444 is NO, at 448, the SAD threshold parameter (δ) is increased and processing continues at 408. If the determination at 444 is YES, the modified separation matrix W(ω) is provided as an output.

Figure 5:
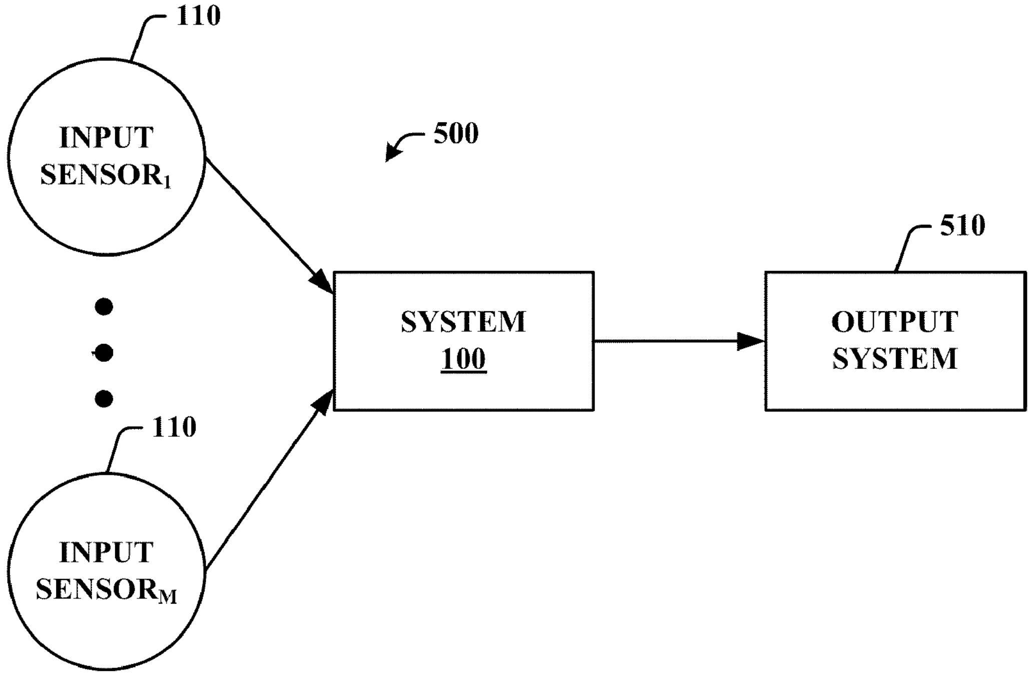
FIG. 5 illustrates a teleconferencing system.

Turning to FIG. 5, the system 100 can be a component of a teleconferencing system 500. The system 100 is located physically near input sensors 110 and receives signals $x_m(k)$ from the input sensors 110. The system 100 provides estimated source signals $y_m(k)$ to an output system 510. For example, the source signals $y_m(k)$ can be provided via the Internet, a voice-over-IP protocol, a proprietary protocol and the like. In this example, separation of the source signals is performed by the system 100 prior to transmission to the output system 510.

Figure 6:
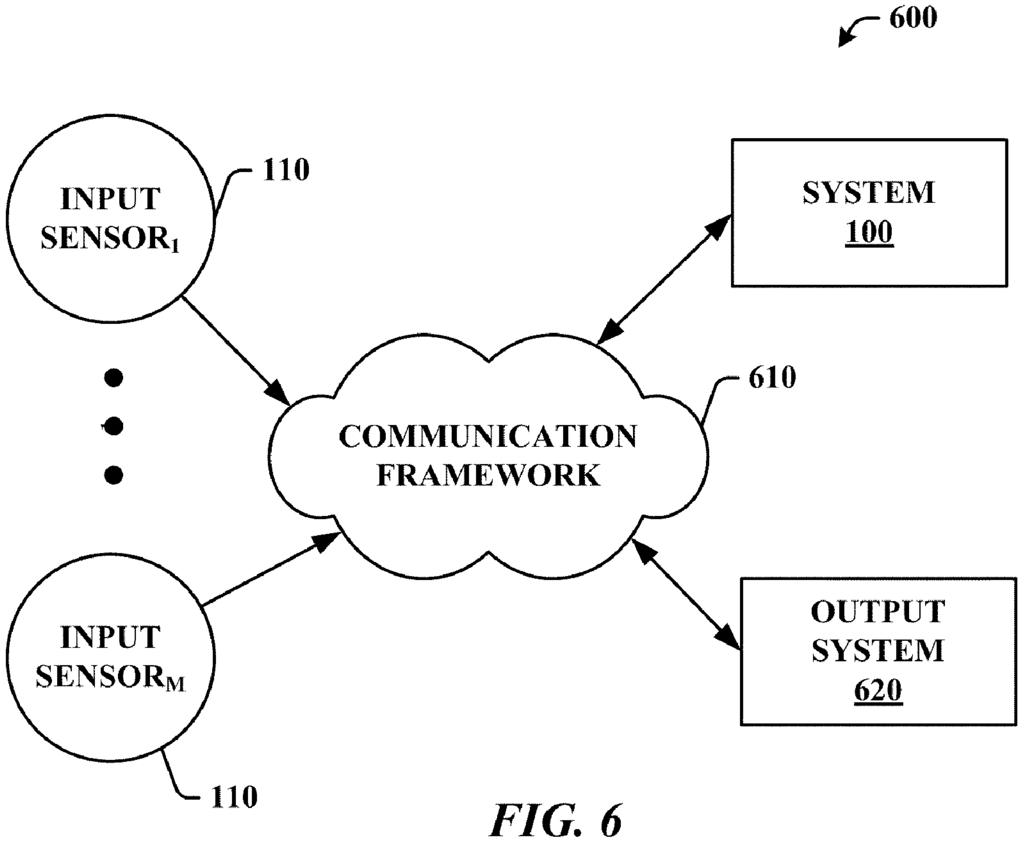
FIG. 6 illustrates another teleconferencing system.

FIG. 6 illustrates a teleconferencing system 600 in which the system 100 is provided as a service (e.g., web service). The system 100 receives signals $x_m(k)$ from the input sensors 110 via a communication framework 610 (e.g., the Internet). The system 100 provides estimated source signals $y_m(k)$ to an output system 620, for example, via the communication framework 610.

Figure 7:
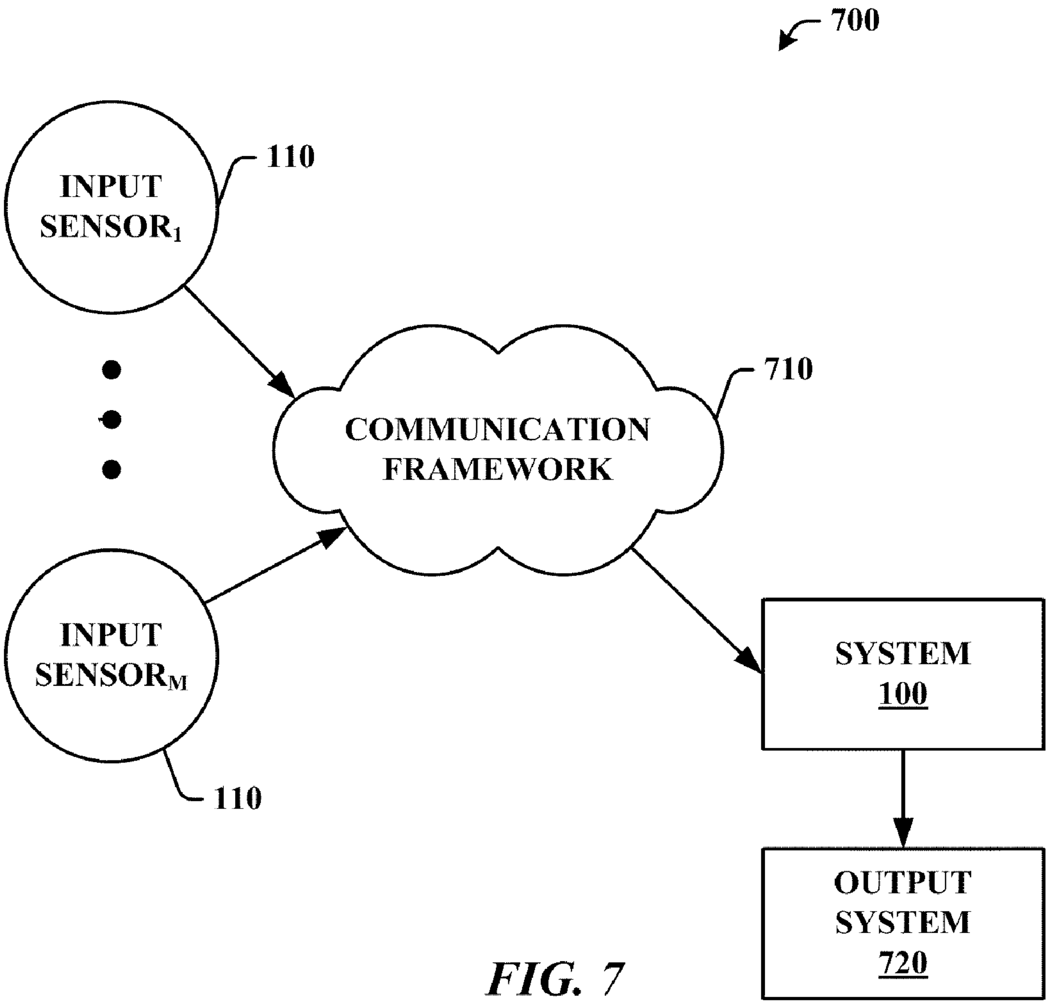
FIG. 7 illustrates yet another teleconferencing system.

FIG. 7 illustrates a teleconferencing system 700 in which the system 100 receives signals $x_m(k)$ from the input sensors 110 via a communication framework 710 (e.g., the Internet, intranet, etc.). The system 100 provides estimated source signals $y_m(k)$ to an output system 720.

Figure 8:
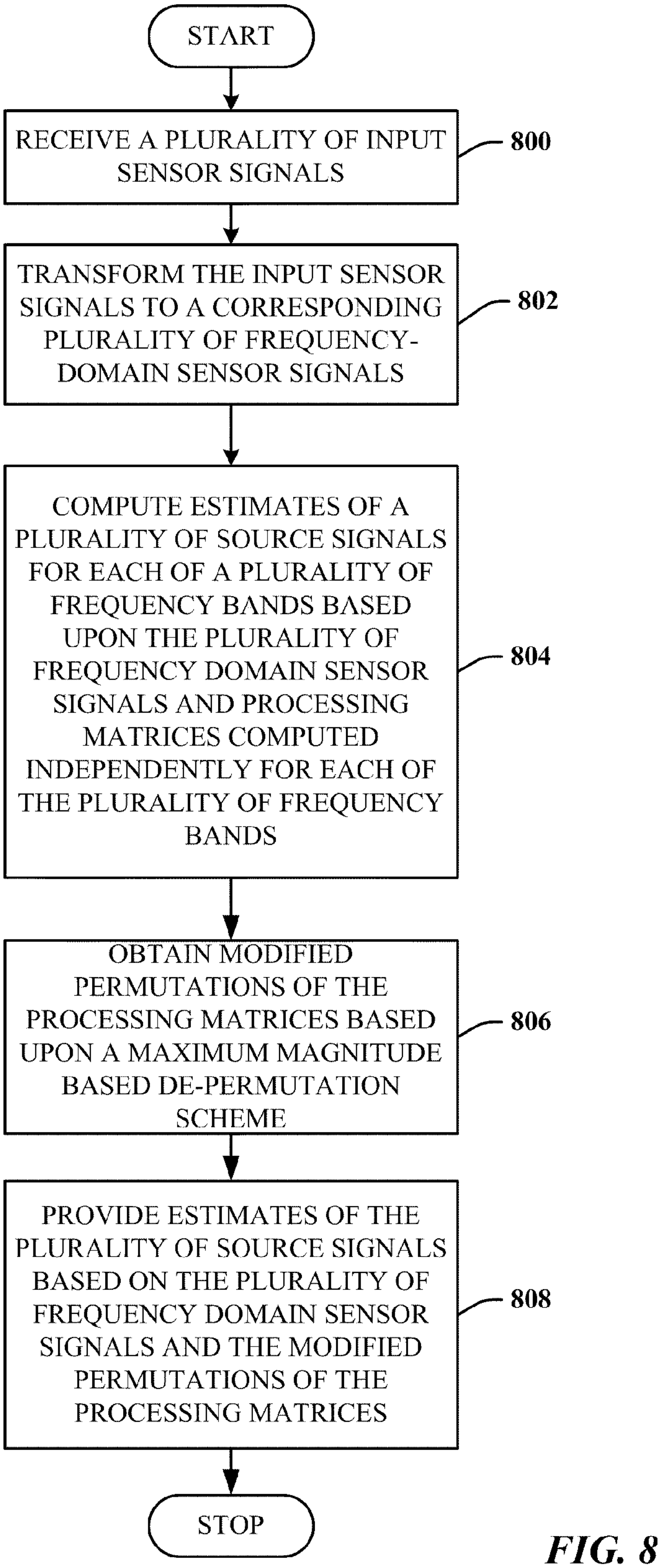
FIG. 8 illustrates a method of blindly separating a plurality of source signals.

FIG. 8 illustrates a method of blindly separating a plurality of source signals. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 800, a plurality of input sensor signals is received. At 802, the input sensor signals are transformed to a corresponding plurality of frequency-domain sensor signals (e.g., via the short-time Fourier transform). At 804, an estimate of the plurality of source signals for each of a plurality of frequency bands is computed based upon the plurality of frequency-domain sensor signals. Further, processing matrices are computed independently for each of the plurality of frequency bands.

At 806, modified permutations of the processing matrices are obtained based upon a maximum magnitude based de-permutation scheme. At 808, estimates of the plurality of source signals is provided based upon the plurality of frequency domain source signals and the modified permutations of the processing matrices.

Figure 9:
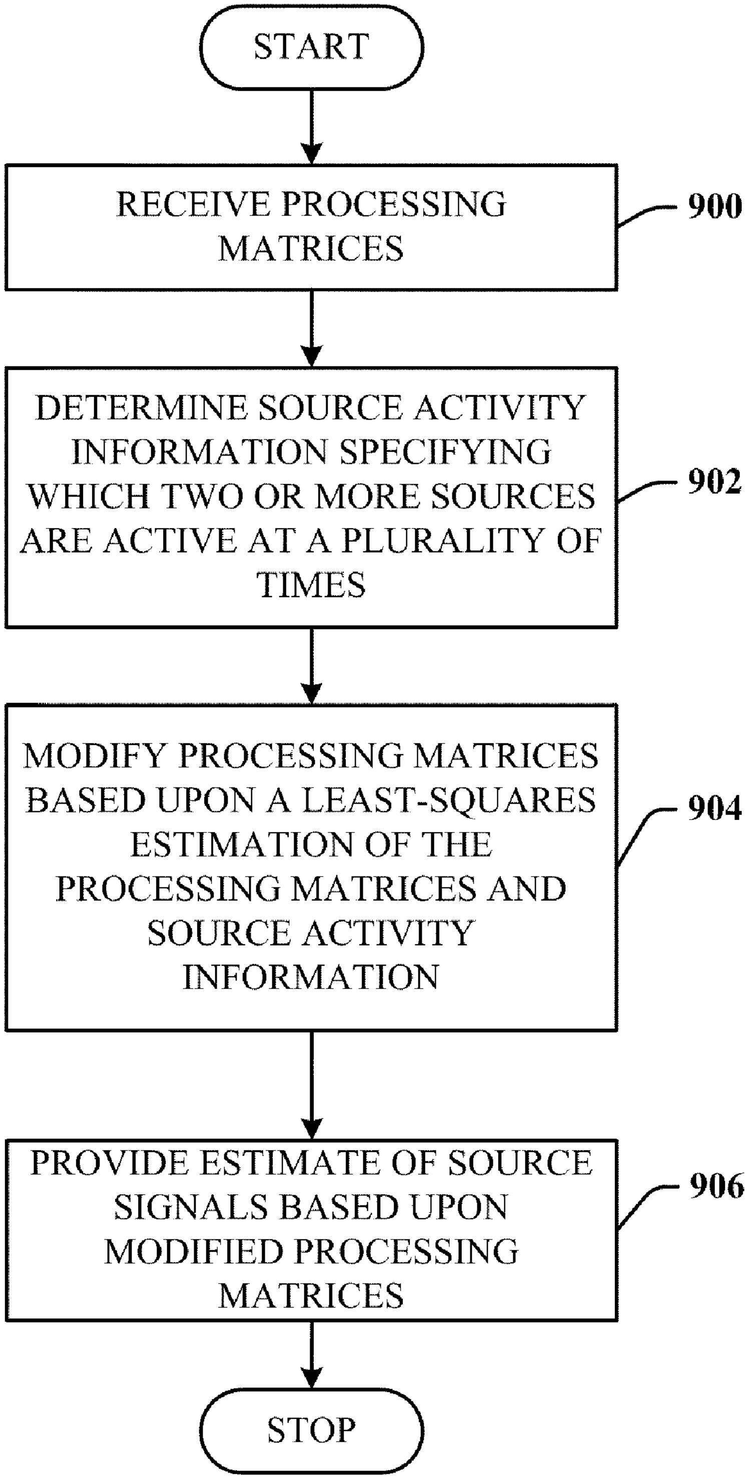
FIG. 9 illustrates another method of blindly separating a plurality of source signals.

FIG. 9 illustrates another method of blindly separating a plurality of source signals. At 900, processing matrices are received. At 902, source activity information is determined specifying which of two or more sources are active at a plurality of times. At 904, the processing matrices are modified based upon a least-squares estimation of the processing matrices and source activity information. At 906, an estimate of source signals is provided based upon the modified processing matrices.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 10:
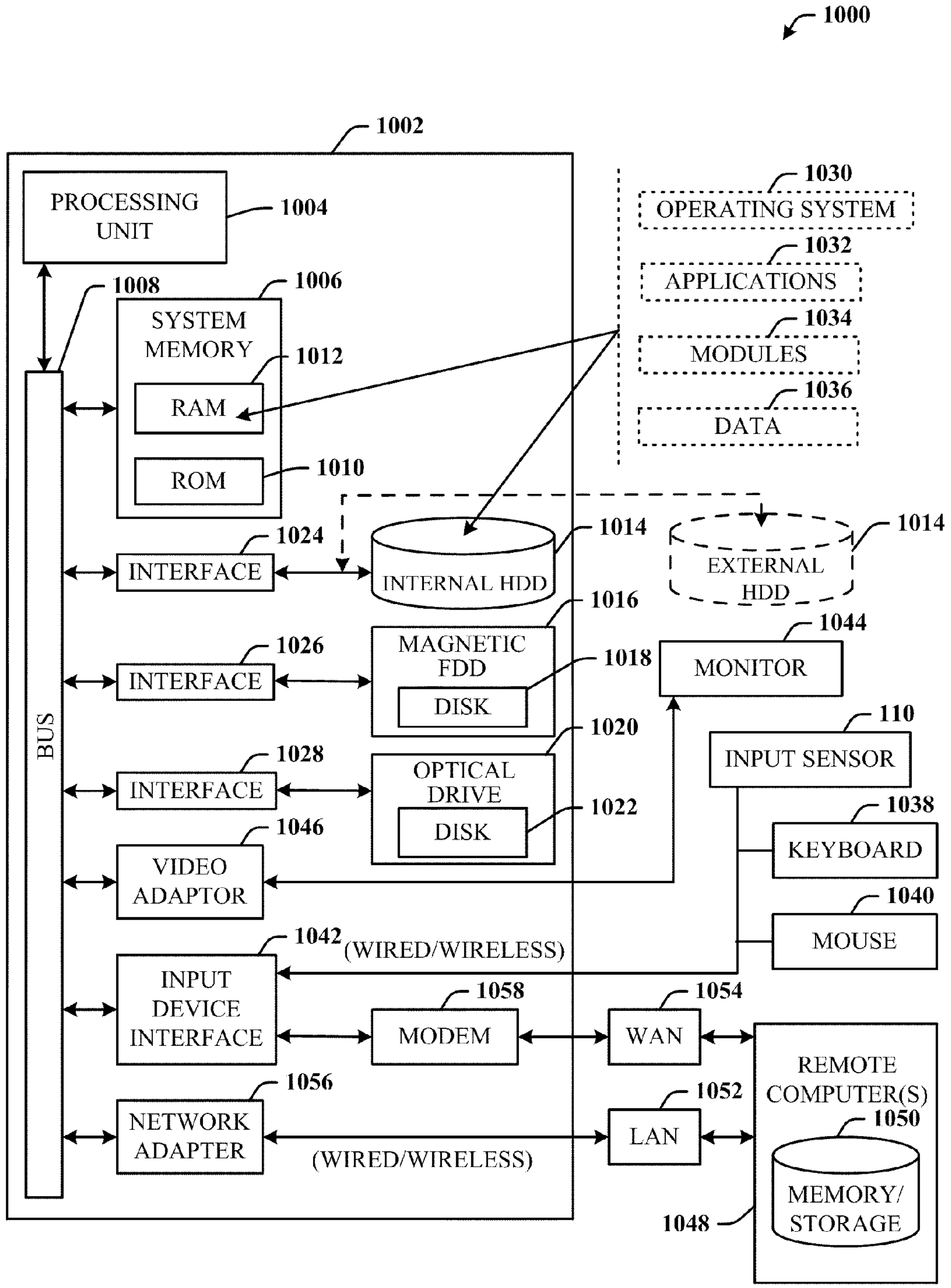
FIG. 10 illustrates a computing system operable to execute the disclosed architecture.

Referring now to FIG. 10, there is illustrated a block diagram of a computing system 1000 operable to execute the disclosed systems and methods. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in the read-only memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The internal hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the disclosed architecture can be implemented with various commercially available operating systems or combinations of operating systems.

A user can enter commands and information into the computer 1002 through one or more wired/wireless input devices, for example, a keyboard 1038 and a pointing device, such as a mouse 1040. Other input devices (not shown) may include an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Referring briefly to FIGS. 1 and 10, audio source signals can be received by an input sensor 110 (e.g., microphone) and forwarded to the frequency transform component 120 via the bus 1008 and processing unit 1004.

Figure 11:
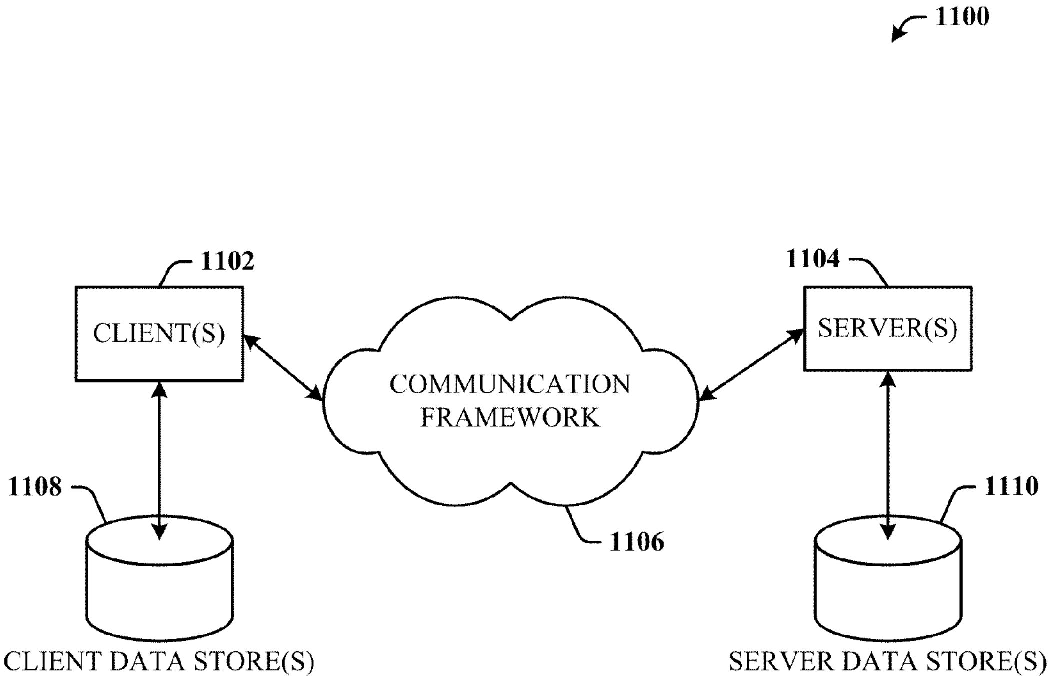
FIG. 11 illustrates an exemplary computing environment.

Referring now to FIG. 11, there is illustrated a schematic block diagram of an exemplary computing environment 1100 that facilitates audio blind source separation. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented audio blind source separation system, comprising:

a frequency transform component for transforming a plurality of sensor signals to a corresponding plurality of frequency domain sensor signals, the plurality of sensor signals received from a plurality of input sensors; and, a frequency domain blind source separation component for estimating a plurality of source signals for each of a plurality of frequency bands based on the plurality of frequency domain sensor signals and processing matrices computed independently for each of the plurality of frequency bands; and a maximum attenuation based de-permutation component for obtaining modified permutations of the processing matrices based upon a maximum-magnitude based de-permutation scheme, wherein the system provides estimates of the plurality of source signals based on the plurality of frequency domain sensor signals and the modified permutations of the processing matrices.

2. The system of claim 1, wherein the frequency domain blind source separation component further employs independent component analysis to compute the processing matrices.

3. The system of claim 1, wherein the processing matrices comprise mixing matrices.

4. The system of claim 1, wherein the processing matrices comprise separation matrices.

5. The system of claim 1, wherein the system further employs source activity detection.

6. The system of claim 5, wherein the system further modifies the processing matrices based upon the source activity detection and a least squares estimation of the plurality of source signals.

7. The system of claim 6, wherein the system modifies the processing matrices more than once based upon the source activity detection and the least squares estimation of the plurality of source signals.

8. The system of claim 1, wherein the frequency transform component employs a short-time Fourier transform for transforming the plurality of sensor signals to the corresponding plurality of frequency domain sensor signals.

9. The system of claim 1, wherein a quantity of sources is less than or equal to a quantity of input sensors.

10. The system of claim 1, wherein at least one of the plurality of input sensors is an embedded microphone.

11. A computer-implemented method of blindly separating a plurality of source signals, comprising:

receiving a plurality of input sensor signals;

transforming the input sensor signals to a corresponding plurality of frequency-domain sensor signals using a short-time Fourier transform; and computing estimates of the plurality of source signals for each of a plurality of frequency bands based upon the plurality of frequency-domain sensor signals and processing matrices computed independently for each of the plurality of frequency bands; and obtaining modified permutations of the processing matrices based upon a maximum magnitude based de-permutation scheme.

12. The method of claim 11, wherein the processing matrices comprise separation matrices.

13. The method of claim 11, wherein the processing matrices comprise mixing matrices.

14. The method of claim 11, further comprising providing estimates of the plurality of source signals based on the plurality of frequency domain sensor signals and the modified permutations of the processing matrices.

15. A computer-implemented method of blindly separating a plurality of source signals, comprising:

determining source activity information specifying which two or more sources are active at a plurality of times; and, modifying processing matrices based upon a least squares estimation of the processing matrices and the source activity information.

16. The method of claim 15, further comprising providing an estimate the source signals based upon the modified processing matrices.

17. The method of claim 15, wherein the processing matrices comprise separation matrices.

18. The method of claim 15, wherein the processing matrices comprise mixing matrices.

19. The method of claim 15, wherein modifying the processing matrices based on source activity information is performed more than once.

20. The method of claim 15, wherein the processing matrices are received from an audio blind source separation system.

* * * * *